United States Patent
Sim

(10) Patent No.: US 9,626,241 B2
(45) Date of Patent: Apr. 18, 2017

(54) WATCHDOGABLE REGISTER-BASED I/O

(75) Inventor: Leong Hock Sim, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 13/996,470

(22) PCT Filed: Dec. 29, 2011

(86) PCT No.: PCT/MY2011/000251
§ 371 (c)(1),
(2), (4) Date: Aug. 21, 2014

(87) PCT Pub. No.: WO2013/100748
PCT Pub. Date: Jul. 4, 2013

(65) Prior Publication Data
US 2014/0365813 A1    Dec. 11, 2014

(51) Int. Cl.
*G06F 11/07*    (2006.01)
*G06F 1/24*    (2006.01)
*G06F 11/30*    (2006.01)

(52) U.S. Cl.
CPC ........... *G06F 11/079* (2013.01); *G06F 1/24* (2013.01); *G06F 11/073* (2013.01); *G06F 11/076* (2013.01); *G06F 11/0745* (2013.01); *G06F 11/3041* (2013.01); *G06F 11/3055* (2013.01)

(58) Field of Classification Search
CPC . G06F 11/0745; G06F 11/221; G06F 11/3041
See application file for complete search history.

(56) References Cited

U.S. PATENT DOCUMENTS

| | | | | |
|---|---|---|---|---|
| 7,168,019 B1 * | 1/2007 | Chang | ................... | G06F 11/221 714/724 |
| 7,340,596 B1 * | 3/2008 | Crosland | ................... | G06F 1/24 713/1 |
| 2006/0085699 A1 * | 4/2006 | Hathorn | ................ | G06F 11/221 714/56 |
| 2007/0248018 A1 * | 10/2007 | Ranallo | ................. | G06F 11/221 370/241 |
| 2010/0312943 A1 | 12/2010 | Uehara et al. | | |

(Continued)

OTHER PUBLICATIONS

Notification of Transmittal of the International Search Report and the Written Opinion or the International Searching Authority, or the Declaration for PCT Counterpart Application No. PCT/MY2011/000251, 8 pgs., (Sep. 26, 2012).

(Continued)

*Primary Examiner* — Yolanda L Wilson
(74) *Attorney, Agent, or Firm* — Nicholson De Vos Webster & Elliott, LLP

(57) ABSTRACT

An apparatus comprising a data storage device to store a plurality of register tracking values, each of the plurality of register tracking values to indicate a last successful Input/Output (I/O) port check, an initialization module to reset a first register tracking value in the data storage device upon receipt of an initialization signal from an I/O refresh subsystem corresponding to the first register tracking value and a failure detection module to identify a second register tracking value in the data storage device that has a value indicating an expired register tracking value.

17 Claims, 3 Drawing Sheets

(56) References Cited

U.S. PATENT DOCUMENTS

| | | | |
|---|---|---|---|
| 2011/0126082 A1* | 5/2011 | Pickel | G06F 11/0739 |
| | | | 714/768 |
| 2011/0202797 A1 | 8/2011 | Mezhibovsky et al. | |
| 2012/0019278 A1* | 1/2012 | Shen | G06F 11/221 |
| | | | 324/756.01 |
| 2013/0097460 A1* | 4/2013 | Jeong | G06F 11/221 |
| | | | 714/37 |
| 2015/0193321 A1* | 7/2015 | Ngo | G06F 11/3027 |
| | | | 714/758 |

OTHER PUBLICATIONS

PCT Notification concerning Transmittal of International Preliminary Report on Patentability (Chapter I of the Patent Cooperation Treaty) for PCT Counterpart Application No. PCT/MY2011/000251, 5 pgs., (Jul. 1, 2014).

* cited by examiner

WATCHDOGABLE REGISTER-BASED I/O

CROSS-REFERENCE TO RELATED APPLICATION

This patent application is a U.S. National Phase Application under 35 U.S.C. §371 of International Application No. PCT/MY2011/000251, filed Dec. 29, 2011, entitled WATCHDOGABLE REGISTER-BASED I/O.

FIELD OF THE INVENTION

Embodiments of the invention relate to a computer system. Specifically, the embodiments of the invention relate to a method and system for detecting input/output (I/O) port related failures.

DESCRIPTION OF THE RELATED ART

Computer systems include a variety of components that have Input/Output (I/O) subsystems that communicate with or control internal and external I/O devices. Many of the components of the computer system such as peripheral component interconnect (PCI) or PCI express devices, general purpose I/O (GPIO) devices, low pin count (LPC) devices and similar components include I/O ports that connect to other devices such as light emitting diodes, sensors, solenoids, buttons, switches and similar devices that provide input to the computer system or are controlled by an output signal from the computer system. Each of these I/O ports typically encompasses a register or set of registers that temporarily store data to be transmitted through the I/O port to the connected I/O device. These registers will often include a set of storage locations that each corresponds to a separate bit or line of a connection to the I/O device. Frequently, these connections are sized based on the amount or type of data or signals transmitted between the computer processor and connected I/O devices, such as 4 bit, 8 bit, 16 bit, 32 bit or 64 bit connections.

These I/O ports and connections can also be within integrated circuits or between integrated circuits. System on a chip (SOC) components and similar components often include a number of subcomponents that are connected with I/O devices through I/O ports. The I/O ports frequently come in the form of a set of pins that connect an integrated circuit or portion of an integrated circuit to the lines (i.e., wires or similar medium) between the I/O port and the I/O device. These I/O ports can be a point of failure in the computer system when the registers fail to properly record electrical signals from the connected lines between the I/O subsystem and an I/O device and where the registers become stuck in logical high or low positions. Similarly, the logic for recording the corresponding register bits that store data to be transmitted or that is received from the lines are also points of failure. When such failures occur the components relying on these I/O ports and their subcomponents are unaware of the failure and receive corrupted data as a result, but the components are unable to take corrective action due to the lack of information about the source of the failure or data corruption. Further, larger system failures may occur due to the lack of information regarding the source of the corruption or failure that if known could be used to prevent component failure and/or the total system failure.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
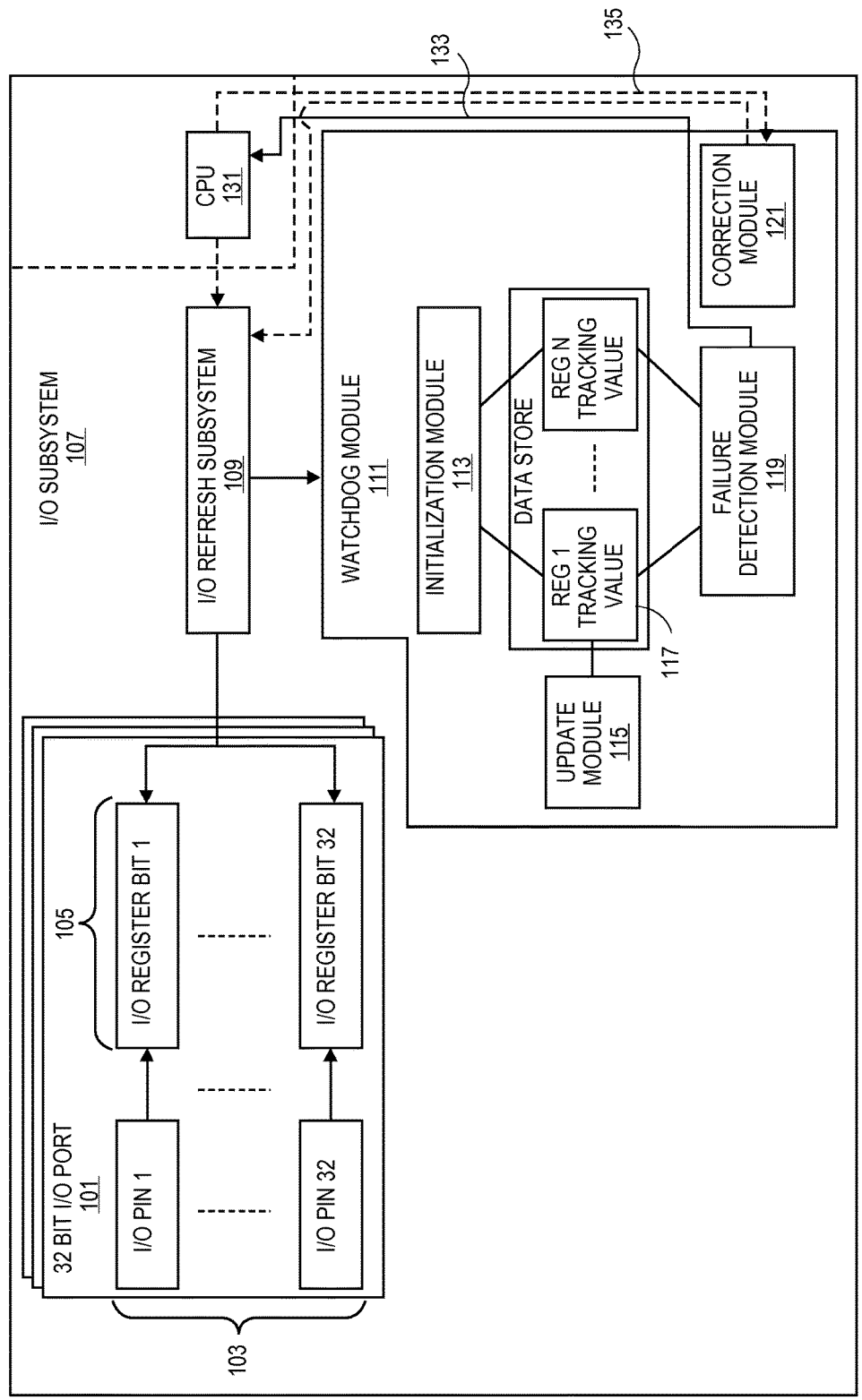
FIG. 1 is a diagram of one embodiment of an I/O subsystem including a watchdog module in communication with a central processing unit.

FIG. 1 is a diagram of one embodiment of an I/O subsystem including a watchdog module. The I/O subsystem 107 includes a set of I/O ports 101, an I/O refresh subsystem 109, and a watchdog module 111. The I/O subsystem 107 may be coupled to a CPU 131. The connection between the I/O subsystem 107 and the CPU 131 can be through any type of bus or specialized communication medium. In one embodiment, the I/O subsystem 107 and CPU 131 are part of a shared integrated circuit or system on a chip (SoC) and are in direct communication with one another. In other embodiments, the I/O system 107 can be separated from a CPU 131 by any number of intermediate components, buses or communication mediums. In further embodiments, I/O subsystem 107 may be in communication with other types of processing units such as graphic processing units, network processing units or similar processing units. One skilled in the art would understand that the illustrated system is provided by way of example and not by limitation, that the structures, techniques and features described herein are applicable to other architectures or components wherein a processing unit is capable of taking corrective action in response to receiving information about the failure of an I/O port or an I/O port component.

The I/O subsystem 107 can include any number of I/O ports 101 that have any size, shape or any combination of varying sizes and types of I/O ports. For sake of clarity, I/O subsystem 107 with a single 32 bit I/O port 101 is provided by way of example. One skilled in the art would understand that computer architectures can have multiple I/O ports 101, multiple I/O refresh subsystems 107 and multiple watchdog modules 111 that can have a 1:1 relationship with each other or can have a one to many relationship between any number or grouping of I/O ports 101 and other I/O components.

In an example embodiment, the I/O port 101 is a 32 bit I/O port. Accordingly, the I/O port encompasses 32 pins 103. Each of the pins 103 has a corresponding I/O register bit 105 that together form the I/O register 105 for the I/O port 101. Each of these registers 105 can be read and written by the I/O subsystem 107 to receive data from an I/O device or to transmit data or signals to an I/O device through the I/O port 101. This transfer of data can be between the I/O device and the CPU 131 or other components of a computer system that are managed by the CPU 131.

For input I/O ports or input pins of the I/O ports 101, the values of the I/O register bits 105 are set by the I/O refresh subsystem 109 based on the electrical value presented on the corresponding I/O pin 103 for incoming data reception. The logical value on the I/O pins 103 is sampled at the I/O port 101 and the value is recorded by the I/O refresh subsystem 109 in the corresponding I/O register bit of the I/O register 105. This sampling can occur at any frequency based on the type of I/O port 101 and corresponding I/O device coupled to the I/O port 101 as well as general computer system operating frequency. The data in I/O register 105 can be read out or accessed by any other component in the computer system including the CPU 131, the memory management components or similar components within the system. The communication mechanism between the I/O register 105 and the other components that may access the contents are not illustrated for the sake of clarity. The I/O register 105 can be coupled to any type of internal communication system or bus for accessing and reading I/O registers 105.

Conversely, for output I/O ports or output pins, data stored in the I/O register 105 is used to drive the electrical value presented on the I/O pins 103 for signaling the I/O device connected to the I/O port 101. The values of the I/O register bits 105 are set by the I/O refresh subsystem 109 based on data or instructions received from the CPU 131 or other system components. The logical value on the I/O pins 103 is driven at the I/O port 101 based on the value that is recorded by the I/O refresh subsystem 109 in the corresponding I/O register bit of the I/O register 105. This driving of the I/O pints 103 can occur at any frequency based on the type of I/O port 101 and corresponding I/O device coupled to the I/O port 101 as well as general computer system operating frequency. The data in I/O register 105 can be written to or accessed by any other component in the computer system including the CPU 131, the memory management components or similar components within the system. The communication mechanism between the I/O register 105 and the other components that may write to the I/O registers 105 are not illustrated for the sake of clarity. The I/O register 105 can be coupled to any type of internal communication system or bus for accessing and writing to the I/O registers 105.

The I/O refresh subsystem 109 can verify each bit in each I/O register 105 that it records based on the value of the corresponding I/O pin 103. The register bit verification can be in the form of reading back a register bit value that has been recorded before the next sampling of the corresponding I/O pin 103. If the value read back from the I/O register 105 does match the expected value recorded by the I/O refresh subsystem 109, then the I/O refresh subsystem 109 may send a re-initialization signal to the watchdog module 111 corresponding to the I/O register 105 or the I/O register bit that has been successfully refreshed.

The watchdog module 111 can be a part of the I/O subsystem 107 or can be separate from the I/O subsystem 107. In one embodiment, the watchdog module 111 includes an initialization module 113, an update module 115, a data store for a set of registered tracking values 117, a failure detection module 119 and optionally a correction module 121. The watchdog module 111 can include any number of registered tracking values or a data storage device capable of storing any number of registered tracking values 117. Each registered tracking value 117 may correspond to a separate I/O register 105 or an individual I/O register bit or any combination thereof.

The initialization module 113 can set the values in each of the register tracking values at the time the system is first initialized and also in response to a re-initialization request or signal from the I/O refresh subsystem 109. The reset value or the base value for the register tracking values can be any value depending on system design and configuration. The register tracking value represents the amount of time or number of cycles that the I/O refresh subsystem 109 can go without having to re-initialize a tracking value based upon a successful refresh of the I/O register or I/O register bit 105.

Failure to reset a register tracking value 117 is an indicator that the corresponding register or the corresponding register bit has not changed and therefore the I/O register 105, register bit has failed or the I/O refresh subsystem 109 has failed. The length of time or number of cycles that are allowed to elapse before the failure is registered drives the selection of the default register tracking value 117. The less fault tolerant or error tolerant the system that watchdog module 111 is used within, then the shorter or smaller the register tracking value 117 is. The register tracking value 117 can be periodically updated by the update module 115. The update module 115 modifies each of the register tracking values 117 at a fixed rate. The update module 115 thereby marks the passage of time or cycles in the subsystem by altering the register tracking values at fixed intervals where the alteration of the register tracking values is a fixed amount. For example, the update module 115 can decrement each of the register tracking values at a specific rate until these register tracking values 117 are each zero.

Failure detection module 119 monitors the register tracking values 117. Upon detecting that one of the register tracking values 117 has reached a threshold value, the failure detection module 119 generates an interrupt to the CPU 131. The interrupt 133 to the CPU 131 notifies the CPU 131 of the failure of a register 105, register bit or I/O refresh subsystem 109. The failure detection module 119 can generate the interrupt signal 133 in response to detecting a threshold value such as a zero in cases where the register tracking values 117 are decremented or detecting some higher value in cases where the register tracking values 117 are incremented or similarly modified. The failure detection module 119 can read the register tracking values 117 on a periodic basis. The failure detection module 119 can read and detect for failures on each increment or each interval that the update module 115 modifies the register tracking values 117 or at any other rate.

In one embodiment, the watchdog module 111 can participate in the effort to correct for a detected failure through the functions of a correction module 121. The correction module 121 can be in communication with the CPU 131 and the I/O refresh subsystem 109, as well as other I/O subsystem 107 components. The CPU 131 can send instructions to the correction module 121 to take corrective action such as disabling an I/O port 101, a re-initialization of an I/O register 105 or a register tracking value 117. In some embodiment, the correction module 121 can also communicate with I/O refresh subsystem 109 to check the functioning of the I/O refresh subsystem 109 and provide further directions to the I/O refresh subsystem 109. The CPU 131 can likewise be enabled to direct the I/O refresh subsystem 109, to check its functionality or to perform a new check or re-initialization of the I/O port 101. The correction module 121 can be part of the watchdog module 111 or it can be a separate component of the I/O subsystem 107 or a component separate from the I/O subsystem 107.

The CPU 131 can be any type of processing device that makes use of the functionality of I/O ports 101 such as a central processing unit of a computer system, a graphics processor, network processor or similar processing device. The CPU 131 can be connected to the I/O port 101 through a direct memory access (DMA) controller, a bus, an I/O controller or similar interface.

Figure 2:
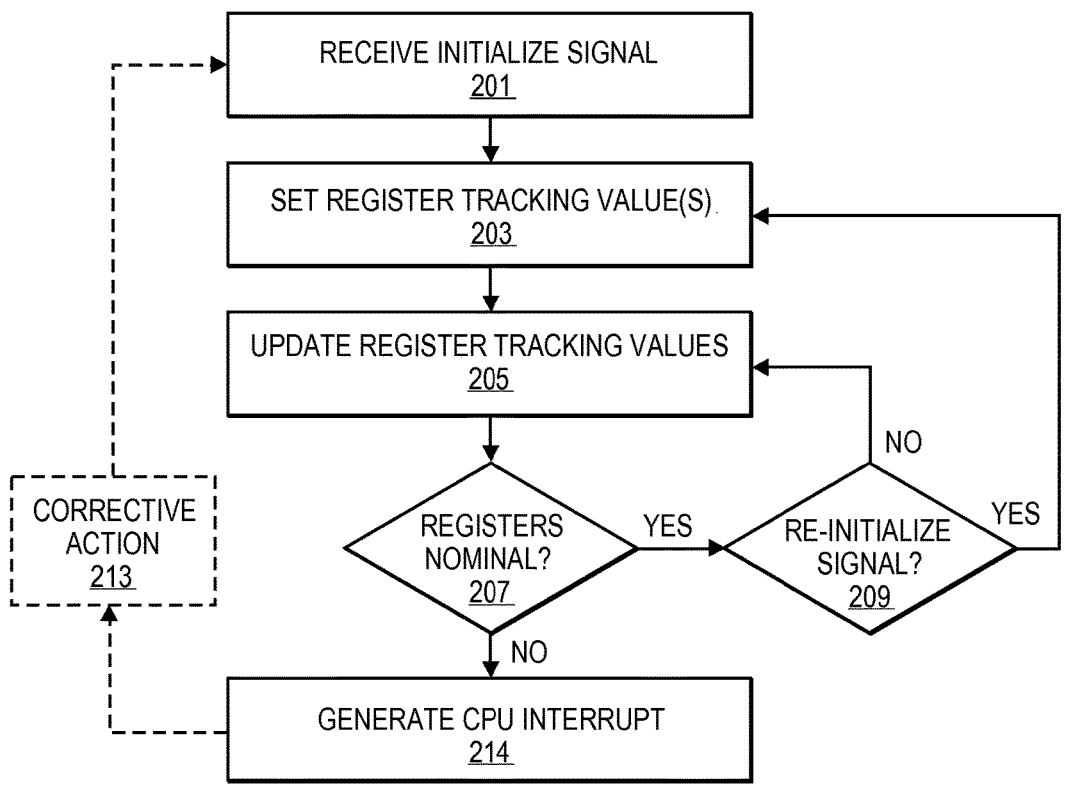
FIG. 2 is a flowchart of one embodiment of function of the watchdog module.

FIG. 2 is diagram of one embodiment of the process executed by the watchdog module. In one embodiment, the watchdog module begins operation in response to an initialization signal being received from the I/O refresh subsystem (Block 201). This initialization signal can be received at the time the system is started up and upon each successful refresh (i.e., update) of an I/O register or I/O register bit. The successful refresh can generate a separate or distinct type of initialization signal. Further, the initialization signal can indicate the particular register or register bit that is being initiated.

In response to receiving an initialization signal, the watchdog module sets or resets a watchdog timer value. These watchdog timer values may be the register tracking values (Block 203). The register tracking values can be set to any value including zero when the update module increments the register tracking values or some larger value when the update module decrements the register tracking values. The values that the register tracking values are set at or initialized to can be selected based on the length of time or number of cycles that the corresponding I/O port register pins can be allowed or designed to be in the failure state.

The register tracking values are periodically updated by an update module (Block 205). The update can occur at any timing interval. In each case, the interval is the same to mark a number of cycles or amount of time that has transpired. The update of the register tracking values can be an increment or decrement of the values or similar modification of the register tracking values. After the register values are updated, the check is made to determine whether the registers indicate each of the corresponding I/O ports or I/O registers are nominal (Block 207). If a threshold value such as a predefined value that the register tracking values have exceeded or a zero indicates for the register tracking values are decremented is reached, then the corresponding register or register bit is determined to correspond to a failed I/O refresh subsystem or a failed I/O port. In this case, the CPU interrupt is generated (Block 211). The CPU interrupt is sent to the CPU or similar processing device to be notified of the failure of a corresponding I/O port or pin. In some embodiments, a corrective action may then be taken (Block 213). The correction action can come in the form of a re-initialization of a port or bus or similar architecture adjustment directed by the CPU or connection module.

In cases where the registers are nominal, a check is made to see if a re-initialization signal has been received (Block 209). If no re-initialization signal has been received from the I/O refresh subsystem, then the next update of the register tracking values can commence (Block 205). If a re-initialization signal has been received, then the register tracking values are reset (Block 203).

This process can be carried out in parallel for each of the separate register tracking values, corresponding ports or register bits. One skilled in the art would understand that this process can be executed by a watchdog module or a similar component that is able to receive initialization signals that indicate the successful refresh of an I/O register or I/O port tied to an I/O port. In other embodiments, the I/O refresh subsystem is integrated with the watchdog module and the refresh subsystem functionality of checking the register bits for a successful refresh is integrated into this process. The I/O refresh subsystem can check the successful refreshing of the registers and register bits, asynchronous with the watchdog module's process of detecting failed I/O ports and I/O refresh subsystem.

Figure 3:
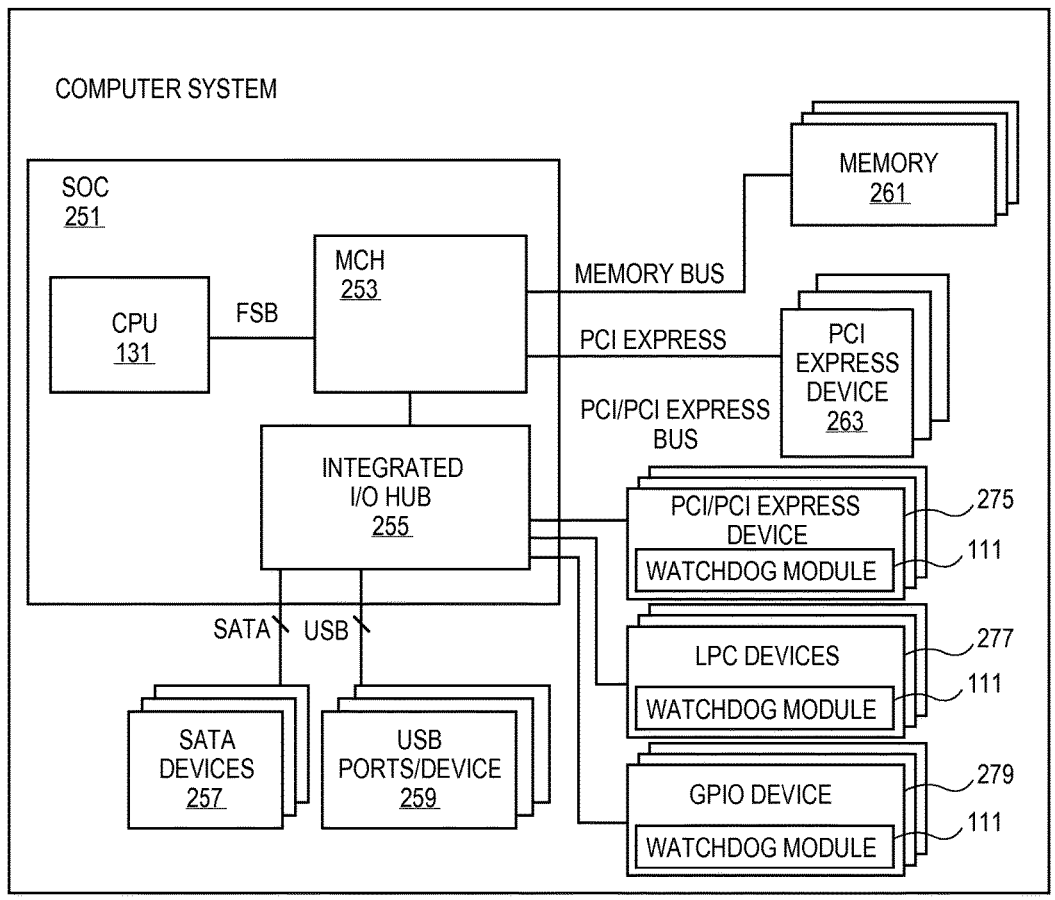
FIG. 3 is a diagram of a computer system incorporating one embodiment of the watchdog module.

FIG. 3 is a diagram of one embodiment of a computer system implementing the watchdog module. In one embodiment, the computer system may include a system-on-a-chip (SoC) integrated circuit 251, a set of memory devices 261 and a set of peripheral devices 263, 257 and 259. The system-on-a-chip 251 can include any set of components including a CPU 131, a memory controller hub (MCH) 253, an integrated I/O chipset 255 and similar components. The CPU 131 executes instructions and software for the computer system and it communicates with the memory controller hub 253 over a front side bus (FSB) or similar communication mechanism.

The memory controller hub 253 provides an interface between the memory devices 261 and the peripheral devices 263 and the CPU 131. The memory controller hub 253 can communicate with the memory devices 261 over a memory bus and communicate with the peripheral devices over a bus such as a PCI express bus or similar communication mechanism. For example, graphics cards or processors can be connected to the MCH 253 over a PCI express bus.

The integrated I/O hub 255 can provide an interface for certain types of peripheral devices such as SATA devices 257, universal serial base (USB) ports and devices 259, PCI devices, PCI express devices 275, LPC devices 277 and GPIO devices 279. SATA devices 257 can include such devices as solid state storage devices, flash drives, magnetic storage devices such as hard disks and similar storage devices. USB ports and devices 259 can include ports for a basic computer system to attach to external devices such as mice, keyboards, cameras and similar devices. PCI and PCI express devices can include network cards, audio cards, application specific integrated circuits (ASICs), and similar devices. LPC devices can include ASICs, basic I/O system (BIOS) devices, power management devices and similar I/O devices. GPIO devices can include LEDs, switches, buttons, and similar I/O devices. One skilled in the art would understand that any type or configuration of I/O devices can be connected with a computer system and each of these types of I/O devices can be monitored by a watchdog module 111.

A watchdog module 111 monitors the functioning of the I/O ports 101 related to the connection with any combination of a set of I/O devices such as PCI/PCI express, LPC, GPIO or similar I/O devices. The watchdog module 111 can signal an error to the CPU 131 using a system interrupt or similar signal to the CPU 131 or similar component of the computer system. In other embodiments, the watchdog module 111 can be included as a separate component from I/O devices or can have a specialized bus or communication medium for communicating with the CPU 131 or other computer system components to enable the watchdog module 111 to reliably notify the CPU 131 or other computer system components of an I/O port failure. The watchdog module 111 can also incorporate or be in communication with a correction module (not shown) that can assist in taking corrective action at the command of the CPU 131 or similar computer system component by re-initializing an I/O port, I/O refresh subsystem, an I/O device or similar corrective measure.

Figure 4:
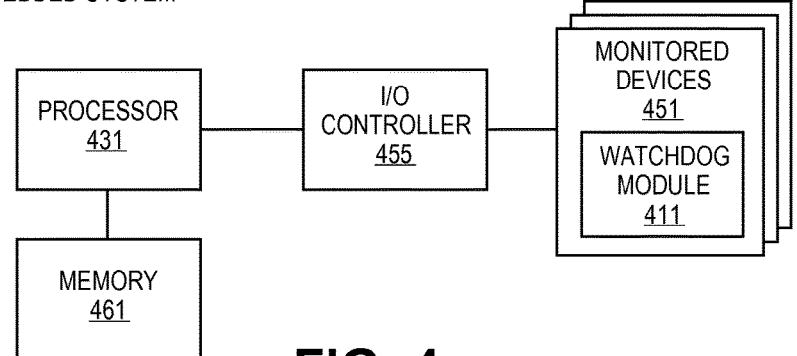
FIG. 4 is a diagram of an embedded system incorporating one embodiment of the watchdog module.

FIG. 4 is a diagram of one embodiment of the watchdog module implemented in an embedded system. In this embodiment, the computer system is an embedded system such as a system used in a consumer electronic device, an automobile, an aircraft or similar apparatus. The embedded system can include a CPU or any type of processing device 431 such as a micro-controller or similar processor. One skilled in the art would understand that the watchdog module 411 can be used in conjunction with any type of processing device or computer system including embedded systems.

A CPU, micro-processor or micro-controller can be any type of processing device 431 including an ASIC, field programmable grid array or similar processing device. The processing device 431 can be coupled to a memory device or set of memory devices that store instructions to be executed by the processing device 431 including applications, firmware, operating systems and similar software. The processing device 431 can communicate with a set of monitored devices 451 either directly or through an I/O controller 455 or similar device.

The monitored device 451 can be any type of I/O device including sensors, lights, solenoids, and similar devices. The I/O controller 455 or processing device 431 can communicate with the monitored devices 451 using any type of signaling or communication protocol or medium. The watchdog module 411 can also communicate with the processor 431 to implement corrective measures such as re-initializing I/O registers, I/O refresh subsystems or I/O devices. The embedded system can include any number or configuration of monitored devices 451 each with a separate watchdog module 111 or with any combination of shared watchdog modules.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
   a data storage device to store a plurality of register tracking values, each of the plurality of register tracking values to indicate a last successful Input/Output (I/O) port check;
   an initialization circuit to reset a first register tracking value in the data storage device upon receipt of an initialization signal from an I/O refresh subsystem corresponding to the first register tracking value; and
   a failure detection circuit to identify a second register tracking value in the data storage device that has a value indicating an expired register tracking value.

2. The apparatus of claim 1, further comprising:
   an update circuit to modify the second register tracking value to indicate passage of time.

3. The apparatus of claim 1, wherein the failure detection circuit generates an interrupt signal to a central processing unit (CPU) to notify the CPU of a failure of an I/O port.

4. The apparatus of claim 3, further comprising:
   a correction circuit to execute a corrective action for a failed I/O port in response to the interrupt signal from the CPU.

5. The apparatus of claim 1, wherein each of the plurality of register tracking values represent a pin of an I/O port.

6. The apparatus of claim 1, wherein each of the plurality of register tracking values represents a separate I/O port.

7. A system comprising:
   a processor;
   an input/output (I/O) subsystem coupled to the processor, the I/O subsystem including an I/O port, an I/O register for the I/O port, and an I/O refresh subsystem; and
   a watchdog circuit coupled to the I/O subsystem and CPU, the watchdog circuit to detect failure of the I/O port and to notify the processor of the failure.

8. The system of claim 7, wherein the watchdog circuit includes a data storage device to store a plurality of register tracking values, each of the plurality of register tracking values to indicate a last successful Input/Output (I/O) port check.

9. The system of claim 8, wherein the watchdog circuit includes an initialization circuit to reset a value of a first register tracking value in the plurality of register tracking values upon receipt of an initialization signal from an I/O refresh subsystem corresponding to the first register tracking value.

10. The system of claim 9, wherein the watchdog circuit includes a failure detection circuit to identify a second register tracking circuit in the plurality of register tracking circuits that has a value indicating an expired register tracking value.

11. The system of claim 10, wherein the watchdog circuit further comprises:
    an update circuit to modify the value of the second register tracking value to indicate passage of time.

12. The system of claim 10, wherein the failure detection circuit generates an interrupt to a central processing unit (CPU) to notify the CPU of a failure of an I/O port.

13. A non-transitory computer-readable medium having instruction stored therein, which when executed by a computer system cause the computer system to perform a set of operations comprising:
    initializing a register tracking value in response to receiving an initialization signal from an I/O refresh subsystem;
    modifying the register tracking value to indicate passage of time, the modifying to occur at fixed intervals; and
    detecting that the register tracking value indicates a failure of an I/O port.

14. The non-transitory computer-readable medium of claim 13, having further instruction stored therein, which when executed cause the computer system to perform a further set of operations comprising:
    generating an interrupt to a CPU in response to detecting the failure of the I/O port.

15. The non-transitory computer-readable medium of claim 13, having further instructions stored therein, which when executed cause the computer system to perform a further set of instruction comprising:
    executing a corrective action on the failed I/O port.

16. The non-transitory computer-readable medium of claim 13, wherein the register tracking value represents a pin of the I/O port.

17. The non-transitory computer-readable medium of claim 13 wherein each of the register tracking value represents a separate I/O port.

\* \* \* \* \*